(12) United States Patent
Hart et al.

(10) Patent No.: US 8,343,007 B2
(45) Date of Patent: Jan. 1, 2013

(54) COMPACT MULTI-SPEED AUTOMATIC TRANSMISSION

(75) Inventors: James M. Hart, Belleville, MI (US); Scott H. Wittkopp, Ypsilanti, MI (US); Bret M. Olson, Whitelake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 159 days.

(21) Appl. No.: 13/017,944

(22) Filed: Jan. 31, 2011

(65) Prior Publication Data
US 2012/0196718 A1     Aug. 2, 2012

(51) Int. Cl.
*F16H 3/44* (2006.01)
(52) U.S. Cl. .................................. 475/288; 475/903
(58) Field of Classification Search .................. 475/271, 475/275, 288, 296, 311, 330, 903
See application file for complete search history.

(56) References Cited

U.S. PATENT DOCUMENTS

| | | | |
|---|---|---|---|
| 4,046,031 A * | 9/1977 | Ott et al. ........................ | 475/280 |
| 4,136,584 A * | 1/1979 | Ishikawa ........................ | 477/151 |
| 6,176,803 B1 | 1/2001 | Meyer et al. | |
| 6,984,187 B2 | 1/2006 | Biermann | |
| 6,991,578 B2 | 1/2006 | Ziemer | |
| 7,018,319 B2 | 3/2006 | Ziemer | |

FOREIGN PATENT DOCUMENTS
DE        102005032881 A1       1/2007

* cited by examiner

*Primary Examiner* — Justin Holmes (57) ABSTRACT

An automatic transmission includes an input shaft, an output shaft and four planetary gear assemblies each having a first, a second and a third element. The automatic transmission includes six fixed or rigid interconnections: one from a third element of the second planetary gear assembly to a second element of the fourth planetary gear assembly, one from a second element of the third planetary gear assembly to the second element of the fourth planetary gear assembly, one from a third element of the first planetary gear assembly to a second element of the second planetary gear assembly, one from a third element of the third planetary gear assembly to a first element of the fourth planetary gear assembly and one from an element of the second planetary gear assembly to an element of the first planetary gear assembly. The automatic transmission also includes four clutches and three brakes which may be selectively engaged to provide nine, ten or eleven speed transmission operation.

16 Claims, 7 Drawing Sheets

| GEAR STATE | GEAR RATIO | RATIO STEP | CLUTCHES AND BRAKES | | | | | | |
|---|---|---|---|---|---|---|---|---|---|
| | | | 94 | 90 | 86 | 84 | 92 | 80 | 82 |
| Rev | -3.153 | | | X | | | X | X | |
| N | | -0.93 | | | | | | | |
| 1st | 3.400 | | | X | X | | X | | |
| 2nd | 2.073 | 1.64 | X | X | X | | | | |
| 3rd | 1.459 | 1.42 | | X | X | | | X | |
| 4th | 1.209 | 1.21 | X | | X | | | X | |
| 5th | 1.000 | 1.21 | | | X | X | | X | |
| 6th | 0.788 | 1.27 | X | | | X | | X | |
| 7th | 0.670 | 1.17 | | X | | X | | X | |
| 8th | 0.553 | 1.21 | X | X | | X | | | |
| 9th | 0.456 | 1.21 | | X | | X | | | X |

X = ON - ENGAGED CARRYING TORQUE

FIG. 3

| GEAR STATE | GEAR RATIO | RATIO STEP | CLUTCHES AND BRAKES | | | | | | |
|---|---|---|---|---|---|---|---|---|---|
| | | | 94 | 90 | 86 | 84 | 92 | 80 | 82 |
| Rev | -3.153 | | | X | | | X | X | |
| N | | -0.93 | | | | | | | |
| 1st | 3.400 | | | X | X | | X | | |
| 2nd | 2.596 | 1.31 | | X | | | X | | X |
| 3rd | 2.073 | 1.25 | X | X | X | | | | |
| 4th | 1.459 | 1.42 | | X | X | | | X | |
| 5th | 1.209 | 1.21 | X | | X | | | X | |
| 6th | 1.000 | 1.21 | | | X | X | | X | |
| 7th | 0.788 | 1.27 | X | | | X | | X | |
| 8th | 0.670 | 1.17 | | X | | X | | X | |
| 9th | 0.553 | 1.21 | X | X | | X | | | |
| 10th | 0.456 | 1.21 | | X | | X | | | X |

X = ON - ENGAGED CARRYING TORQUE

FIG. 4

| GEAR STATE | GEAR RATIO | RATIO STEP | CLUTCHES AND BRAKES ||||||| 
|---|---|---|---|---|---|---|---|---|---|
| | | | 94 | 90 | 86 | 84 | 92 | 80 | 82 |
| Rev | -3.153 | | | X | | | X | X | |
| N | | -0.74 | | | | | | | |
| 1st | 4.240 | | | X | X | | | | X |
| 2nd | 3.400 | 1.25 | | X | X | | X | | |
| 3rd | 2.596 | 1.31 | | X | | | X | | X |
| 4th | 2.073 | 1.25 | X | X | X | | | | |
| 5th | 1.459 | 1.42 | | X | X | | | X | |
| 6th | 1.209 | 1.21 | X | | X | | | X | |
| 7th | 1.000 | 1.21 | | | X | X | | X | |
| 8th | 0.788 | 1.27 | X | | | X | | X | |
| 9th | 0.670 | 1.17 | | X | | X | | X | |
| 10th | 0.553 | 1.21 | X | X | | X | | | |
| 11th | 0.456 | 1.21 | | X | | X | | | X |

X = ON - ENGAGED CARRYING TORQUE

FIG. 5

| GEAR STATE | CLUTCHES AND BRAKES | | | | | |
|---|---|---|---|---|---|---|
| | 94 | 90 | 86 | 84 | 92 | 80 |
| Rev | | X | | | X | X |
| N | | | | | | |
| 1st (0) | | | X | | X | |
| 1st (1) | | X | X | | X | |
| 1st (2) | | | X | | X | X |
| 1st (3) | X | | X | | X | |
| 2nd | X | X | X | | | |
| 3rd | | X | X | | | X |
| 4th | X | | X | | | X |
| 5th (0) | | | X | X | | |
| 5th (1) | | | X | X | | X |
| 5th (2) | | X | X | X | | |
| 5th (3) | X | | X | X | | |
| 6th | X | | | X | | X |
| 7th | | X | | X | | X |
| 8th | X | X | | X | | |

X = ON - ENGAGED CARRYING TORQUE

FIG. 6

| GEAR STATE | CLUTCHES AND BRAKES | | | | | | |
|---|---|---|---|---|---|---|---|
| | 94 | 90 | 86 | 84 | 92 | 80 | 82 |
| Rev |  | X |  |  | X | X |  |
| N |  |  |  |  |  |  |  |
| 1st (0) |  |  | X |  | X |  |  |
| 1st (1) |  | X | X |  | X |  |  |
| 1st (2) |  |  | X |  | X |  | X |
| 1st (3) |  |  | X |  | X | X |  |
| 1st (4) | X |  | X |  | X |  |  |
| 2nd | X | X | X |  |  |  |  |
| 3rd |  | X | X |  |  | X |  |
| 4th | X |  | X |  |  | X |  |
| 5th (0) |  |  | X | X |  |  |  |
| 5th (1) |  |  | X | X |  | X |  |
| 5th (2) |  |  | X | X |  |  | X |
| 5th (3) |  | X | X | X |  |  |  |
| 5th (4) | X | X | X | X |  |  |  |
| 6th | X |  |  |  | X | X |  |
| 7th |  | X |  |  | X | X |  |
| 8th | X | X |  |  | X |  |  |
| 9th |  | X |  |  | X |  | X |

X = ON - ENGAGED CARRYING TORQUE

FIG. 7

| GEAR STATE | CLUTCHES AND BRAKES | | | | | | |
|---|---|---|---|---|---|---|---|
| | 94 | 90 | 86 | 84 | 92 | 80 | 82 |
| Rev |  | X |  |  | X | X |  |
| N |  |  |  |  |  |  |  |
| 1st |  | X | X |  | X |  |  |
| 1st (0) |  |  | X |  | X |  | X |
| 1st (1) |  |  | X |  | X |  |  |
| 1st (2) |  |  | X |  | X | X |  |
| 1st (3) | X |  | X |  | X |  |  |
| 1st (4) |  | X |  |  | X |  | X |
| 3rd | X | X | X |  |  |  |  |
| 4th |  | X | X |  |  | X |  |
| 5th | X |  | X |  |  | X |  |
| 6th (0) |  |  | X | X |  |  |  |
| 6th (1) |  |  | X | X |  | X |  |
| 6th (2) |  |  | X | X |  |  | X |
| 6th (3) |  | X | X | X |  |  |  |
| 6th (4) | X |  | X | X |  |  |  |
| 7th | X |  |  | X |  | X |  |
| 8th |  | X |  | X |  | X |  |
| 9th | X | X |  | X |  |  |  |
| 10th |  | X |  | X |  |  | X |

X = ON - ENGAGED CARRYING TORQUE

FIG. 8

| GEAR STATE | CLUTCHES AND BRAKES | | | | | | |
|---|---|---|---|---|---|---|---|
| | 94 | 90 | 86 | 84 | 92 | 80 | 82 |
| Rev | | X | | | X | X | |
| N | | | | | | | |
| 1st | | X | X | | | | X |
| 2nd (0) | | | X | | X | | |
| 2nd (1) | | X | X | | X | | |
| 2nd (2) | | | X | | X | | X |
| 2nd (3) | | | X | | X | X | |
| 2nd (4) | X | | X | | X | | |
| 3rd | | X | | | X | | X |
| 4th | X | X | X | | | | |
| 5th | | X | X | | | X | |
| 6th | X | | X | | | X | |
| 7th (0) | | | X | X | | | |
| 7th (1) | | | X | X | | X | |
| 7th (2) | | | X | X | | | X |
| 7th (3) | | X | X | X | | | |
| 7th (4) | X | | X | X | | | |
| 8th | X | | | X | | X | |
| 9th | | X | | X | | X | |
| 10th | X | X | | X | | | |
| 11th | | X | | X | | | X |

X = ON - ENGAGED CARRYING TORQUE

FIG. 9

COMPACT MULTI-SPEED AUTOMATIC TRANSMISSION

FIELD

The present disclosure relates to multiple speed automatic transmissions and more particularly to a compact automatic transmission having nine, ten or eleven forward speeds.

BACKGROUND

The statements in this section merely provide background information related to the present disclosure and may or may not constitute prior art.

Multiple speed automatic transmissions are the overwhelming transmission choice for purchasers of passenger cars, sport utility vehicles and light trucks.

In such a typical automatic transmission, certain elements of a plurality of planetary gear assemblies are (1) interconnected by permanent coupling members, (2) selectively interconnected by friction clutches or (3) selectively grounded by brakes. Specific combinations of the clutches and brakes are engaged or activated in sequence to provide a predetermined sequence of numerically related gear ratios and thus output speeds and torques.

Increasingly demanding efficiency, performance and economic goals continue to encourage automatic transmission research and development. A result of this effort has been a steady increase in the number of available forward speeds or gear ratios in an automatic transmission. Whereas three, four or five speed automatic transmissions were once commonplace and considered to provide sufficient operating flexibility and performance, the industry and consumer preference has moved to six and eight speed automatic transmissions.

Because they so closely match the power and torque outputs of an engine to vehicle speed and load, six and eight speed automatic transmissions provide significant performance enhancements and fuel consumption reduction. Nonetheless, such transmissions are known to have drawbacks. Two known and related drawbacks are complexity and cost. Because of their benefits and in spite of their drawbacks, there is ongoing and increasing demand for automatic transmissions having more forward gears or speed ratios. The present invention provides an automatic transmission having nine, ten or eleven forward speeds or gear ratios and one which is both compact and relatively inexpensive.

SUMMARY

The present invention provides a nine, ten and eleven speed automatic transmission having four planetary gear assemblies wherein certain elements are interconnected by rigid members and a plurality of friction clutches and brakes selectively interconnect elements to other elements or ground. The automatic transmission includes an input shaft, an output shaft and four planetary gear assemblies each having a first, a second and a third element, each element being one of a sun gear, a planet gear carrier including a plurality of planet gears and a ring gear. In addition to a fixed connection from a second element of the first planetary gear assembly to the output shaft, the automatic transmission includes five fixed or rigid interconnections: one from a third element of the second planetary gear assembly to a second element of the fourth planetary gear assembly, one from a second element of the third planetary gear assembly to the second element of the fourth planetary gear assembly, one from a third element of the first planetary gear assembly to a second element of the second planetary gear assembly, one from a third element of the third planetary gear assembly to a first element of the fourth planetary gear assembly and one from a first element of the first planetary gear assembly to a first element of the second planetary gear assembly.

The automatic transmission also includes seven torque transmitting devices including four friction clutches and three friction brakes. A first friction clutch selectively connects the input shaft with the third element of the third planetary gear assembly and the first element of the fourth planetary gear assembly. A second friction clutch selectively connects the input shaft with a first element of the third planetary gear assembly. A third friction clutch selectively connects the input shaft with the second element of the second planetary gear assembly. And a fourth friction clutch selectively connects the input shaft with the first elements of both the first and the second planetary gear assemblies. A first brake selectively grounds a third element of the fourth planetary gear assembly. A second brake selectively grounds the third element of the first planetary gear assembly. And a third brake selectively grounds a first element of the third planetary gear assembly.

Thus it is an aspect of the present invention to provide an automatic transmission having nine, ten or eleven forward speeds or gear ratios.

It is a further aspect of the present invention to provide an automatic transmission having nine, ten or eleven forward speeds or gear ratios and reverse.

It is a still further aspect of the present invention to provide an automatic transmission having four planetary gear assemblies each having a sun gear, a planet gear carrier including a plurality of planet gears and a ring gear.

It is a still further aspect of the present invention to provide an automatic transmission having four planetary gear assemblies and a plurality of fixed members interconnecting elements of such planetary gear assemblies.

It is a still further aspect of the present invention to provide an automatic transmission having four planetary gear assemblies and a plurality of torque transmitting members.

It is a still further aspect of the present invention to provide an automatic transmission having four planetary gear assemblies and a plurality of torque transmitting members including friction clutches and brakes.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
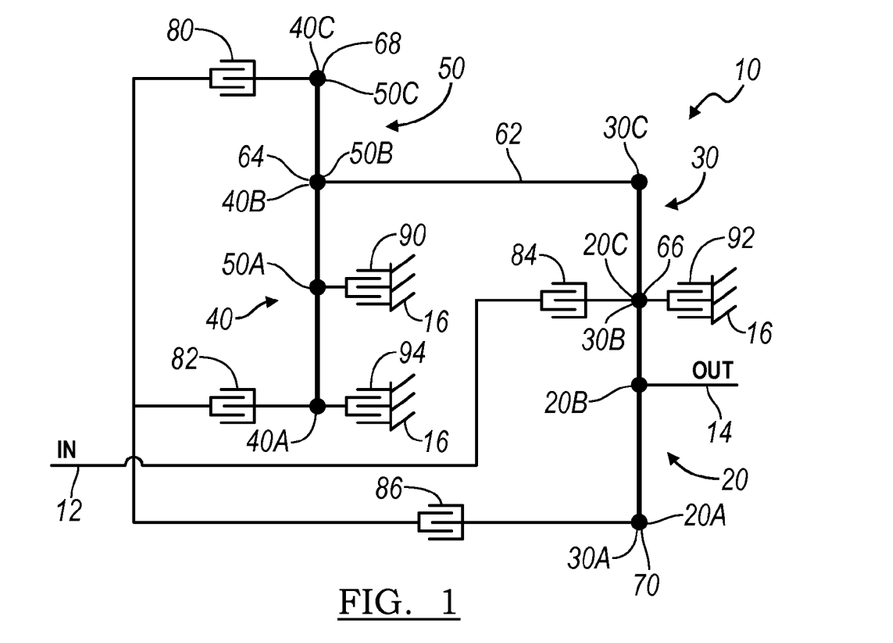
FIG. 1 is a lever diagram that relates to a multiple speed automatic transmission according to the present invention.

With reference to FIG. 1, a multiple, i.e., nine, ten or eleven, speed automatic transmission 10 according to the present invention is illustrated in a lever diagram. A lever diagram is a schematic representation of the components of an automatic transmission wherein certain components such as planetary gear assemblies are represented by nodes. For example, a typical lever, represented by a vertical bar contains thee nodes: one for the sun gear, one for the planet gear carrier and one for the ring gear. The relative lengths of the vertical bars between the nodes of a planetary gear assembly represent the ratios between the components. In some cases where a component of one planetary gear assembly is coupled to a component of another planetary gear assembly, two levers may be combined into a single lever having more than three nodes. Mechanical couplings or interconnections between the nodes of the planetary gear assemblies are represented by horizontal lines and torque transmitting devices such as friction clutches and brakes are represented by interleaved or nested fingers. Further explanation of the format, purpose and use of lever diagrams can be found in SAE Paper No. 810102 entitled, "The Lever Analogy: A New Tool in Transmission Analysis" by Benford and Leising which is fully incorporated herein by reference.

The automatic transmission 10 includes an input shaft or member 12, an output shaft or member 14 and a stationary housing 16 which is also referred to as ground. The automatic transmission 10 also includes four planetary gear assemblies. A first planetary gear assembly 20 includes a first node 20A, a second node 20B which is coupled to and drives the output shaft or member 14 and a third node 20C. A second planetary gear assembly 30 includes a first node 30A which is common with the first node 20A of the first planetary gear assembly 20, a second node 30B which is common with the third node 20C of the first planetary gear assembly 20 and a third node 30C. A third planetary gear assembly 40 includes first node 40A, a second node 40B and a third node 40C. A fourth planetary gear assembly 50 includes a first node 50A, a second node 50B which is common with the second node 40B of the third planetary gear assembly 40 and a third node 50C which is common with the third node 40C of the third planetary gear assembly 40.

In addition to the fixed connection between the second node 20B of the first planetary gear assembly 20 and the output shaft or member 14, the automatic transmission 10 includes five fixed or permanent interconnecting shafts, quills or members between certain components of the four planetary gear assemblies 20, 30, 40 and 50. The third node 30C of the second planetary assembly 30 is coupled to the second node 50B of the fourth planetary gear assembly 50 by a first connecting shaft, quill or member 62. The other four fixed or permanent connections are represented by the common nodes set forth above. Thus, the second node 40B of the third planetary gear assembly 40 is coupled to the second node 50B of the fourth planetary gear assembly 50 by a second connecting shaft, quill or member 64. The third node 20C of the first planetary gear assembly 20 is coupled to the second node 30B of the second planetary gear assembly 30 by a third connecting shaft, quill or member 66. The third node 40C of the third planetary gear assembly 40 is coupled to the third node 50C of the fourth planetary gear assembly 50 by a fourth connecting shaft, quill or member 68. And the first node 20A of the first planetary gear assembly 20 is coupled to the first node 30A of the second planetary gear assembly 30 by a fifth connecting shaft, quill or member 70.

The automatic transmission 10 also includes seven, selectively engageable torque transmitting devices: four torque transmitting friction clutches and three torque transmitting friction brakes. A first friction clutch 80 selectively connects the input shaft 12 with the third node 40C of the third planetary gear assembly 40 and the third node 50C of the fourth planetary gear assembly 50. A second friction clutch 82 selectively connects the input shaft 12 with the first node 40A of the third planetary gear assembly 40. A third friction clutch 84 selectively connects the input shaft 12 with the second node 30B of the second planetary gear assembly 30 and the third node 20C of the first planetary gear assembly 20. A fourth friction clutch 86 selectively connects the input shaft 12 with the first node 30A of the second planetary gear assembly 30 and the first node 20A of the first planetary gear assembly 20. A first friction brake 90 selectively connects and grounds the first node 50A of the fourth planetary gear assembly 50 to the housing 16. A second friction brake 92 selectively connects and grounds the second node 30B of the second planetary gear assembly 30 and the third node 20C of the first planetary gear assembly 20 to the housing 16. A third friction brake 94 selectively connects and grounds the first node 40A of the third planetary gear assembly 40 to the housing 16.

Figure 2:
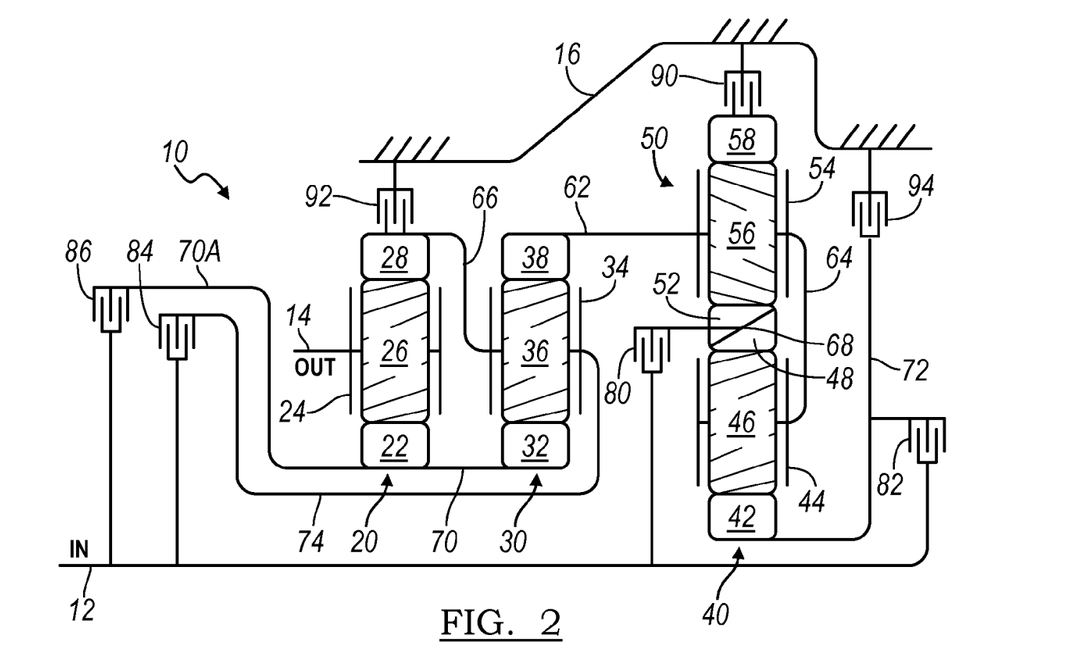
FIG. 2 is a diagrammatic view of the components of an automatic transmission according to the present invention.

Referring now to FIG. 2, a stick diagram presents a schematic layout of the nine, ten and eleven speed automatic transmissions 10 of the present invention. In FIG. 2, the interconnecting members, clutches and brakes are correspondingly presented and numbered whereas the nodes of the planetary gear assemblies now are presented as components thereof such as sun gears, planet gears, planet gear carriers and ring gears.

The automatic transmission 10 includes the input shaft or member 12 which is driven by a prime mover (not illustrated) such as a gasoline, Diesel, flex-fuel or hybrid power plant, the output shaft or member 14 which drives a final drive assembly (not illustrated) and the stationary housing 16 (also referred to as ground) which includes various openings, bores, flanges and other features and receives, positions and protects the various components of the automatic transmission 10.

The automatic transmission 10 also includes the first planetary gear assembly 20 having a first sun gear 22, a first planet gear carrier 24 and a first ring gear 28. Rotatably disposed in the first planet gear carrier 24 on stub shafts and/or bearings (not illustrated) are a plurality of first planet gears 26, one of which is illustrated in FIG. 2. Each of the plurality of first planet gears 26 is in constant mesh with the first sun gear 22 and the first ring gear 28. The second planetary gear assembly 30 includes a second sun gear 32, a second planet gear carrier 34 and a second ring gear 38. Rotatably disposed in the second planet gear carrier 34 on stub shafts and/or bearings (not illustrated) are a plurality of second planet gears 36, one of which is illustrated in FIG. 2. Each of the plurality of second planet gears 36 is in constant mesh with the second sun gear 32 and the second ring gear 38.

The third planetary gear assembly 40 includes a third sun gear 42, a third planet gear carrier 44 and a third ring gear 48. Rotatably disposed in the third planet gear carrier 44 on stub shafts and/or bearings (not illustrated) are a plurality of third planet gears 46, one of which is illustrated in FIG. 2. Each of the plurality of third planet gears 46 is in constant mesh with the third sun gear 42 and the third ring gear 48. The fourth planetary gear assembly 50 includes a fourth sun gear 52, a fourth planet gear carrier 54 and a fourth ring gear 58. Rotatably disposed in the fourth planet gear carrier 54 on stub shafts and/or bearings (not illustrated) are a plurality of fourth planet gears 56, one of which is illustrated in FIG. 2. Each of the plurality of fourth planet gears 56 is in constant mesh with the fourth sun gear 52 and the fourth ring gear 58.

The automatic transmission 10 further includes a plurality of fixed or rigid interconnections between the components of the four planetary gear assemblies 20, 30, 40 and 50. These interconnections take the form of shafts, quills, (tubular connecting members) and other mechanical elements or configurations such as essentially direct coupling depending upon the configuration and proximity of the components. The output shaft 14 is coupled to and driven directly by the first planet gear carrier 24 of the first planetary gear assembly 20.

The first connecting shaft, quill or member 62 interconnects or couples the second ring gear 38 of the second planetary gear assembly 30 to the fourth planet gear carrier 54 of the fourth planetary gear assembly 50. The second connecting shaft, quill or member 64 interconnects or couples the fourth planet gear carrier 54 of the fourth planetary gear assembly 50 to the third planet gear carrier 44 of the third planetary gear assembly 40. The third connecting shaft, quill or member 66 interconnects or couples the first ring gear 28 of the first planetary gear assembly 20 to the second planet gear carrier 34 of the second planetary gear assembly 30. The fourth connecting shaft, quill or member 68 interconnects or couples the third ring gear 48 of the third planetary gear assembly 40 to the fourth sun gear 52 of the fourth planetary gear assembly 50. The fifth connecting shaft, quill or member 70 interconnects or couples the first sun gear 22 of the first planetary gear assembly 20 to the second sun gear 32 of the second planetary gear assembly 30.

The automatic transmission 10 further includes seven, selectively engageable torque transmitting devices, namely, four friction clutches and three friction brakes. As utilized herein, the term "friction clutch" refers to any torque transmitting device having first and second pluralities of interleaved, rotatable friction plates or discs which are compressed by an associated operator or actuator to transmit torque. The term "friction brake" refers to a similar device in which one of the pluralities of plates or discs is stationary, e.g., grounded or connected to the housing 16. It should be understood, however, that other clutch types and configurations are within the purview of this invention.

The first friction clutch 80 is disposed between the input shaft 12 and the fourth connecting shaft, quill or member 68 which interconnects or couples the third ring gear 48 of the third planetary gear assembly 40 and the fourth sun gear 52 of the fourth planetary gear assembly 50. The second friction clutch 82 is disposed between the input shaft 12 and a sixth connecting shaft, quill or member 72 which is connected to the third sun gear 42 of the third planetary gear assembly 40. The third friction clutch 84 is disposed between the input shaft 12 and a seventh connecting shaft, quill or member 74 which is connected to the second planet gear carrier 34 of the second planetary gear assembly 30. The fourth friction clutch 86 is disposed between the input shaft 12 and an extension 70A of the fifth connecting shaft, quill or member 70 which interconnects or couples the first sun gear 22 of the first planetary gear assembly 20 and the second sun gear 32 of the second planetary gear assembly 30.

A first friction brake 90 is disposed between and selectively grounds the fourth ring gear 58 of the fourth planetary gear assembly 50 to the housing 16 of the automatic transmission 10. A second friction brake 92 is disposed between and selectively grounds the first ring gear 28 of the first planetary gear assembly 20 and the second planet gear carrier 34 of the second planetary gear assembly 20 (which is coupled to the first ring gear 28 by the third connecting shaft, quill or member 66) to the housing 16 of the automatic transmission 10. A third friction brake 94 is disposed between and selectively grounds the sixth connecting shaft, quill or member 72 (which is connected to the third sun gear 42 of the third planetary gear assembly 40 and the second friction clutch 82) to the housing 16 of the automatic transmission 10.

Figure 3:
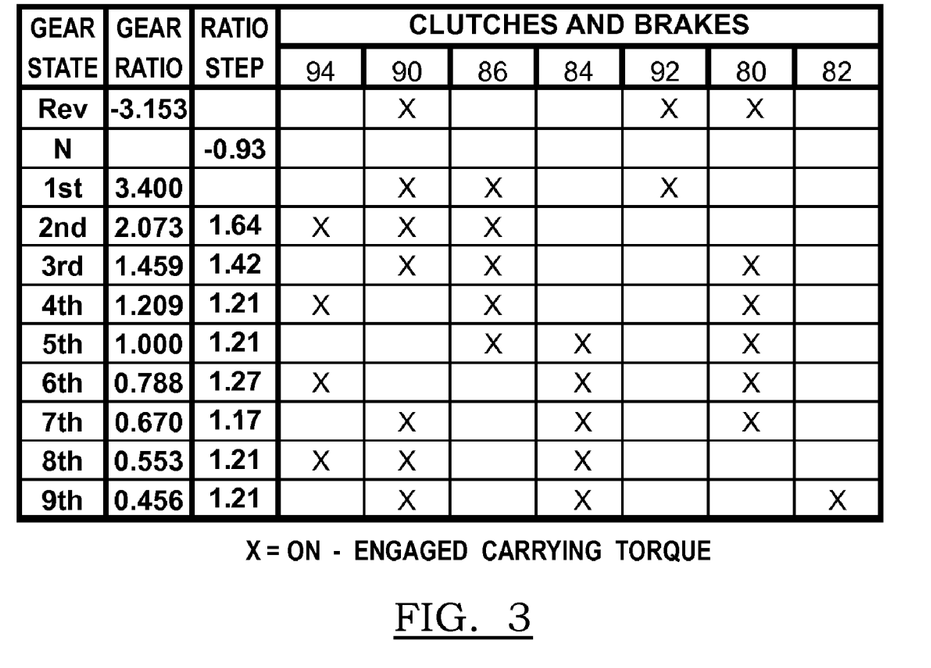
FIG. 3 is a truth table presenting the various combinations of engaged clutches and brakes which achieve a given forward or reverse gear or speed ratio and provide nine forward speeds in a multiple speed automatic transmission according to the present invention.

Referring now to FIG. 3, the sequence of operation, i.e., the activation or engagement of the seven torque transmitting devices, which provides nine forward speeds or gear ratios and reverse is illustrated. FIG. 3 is a truth table which presents the various combinations of clutches and brakes that are activated or engaged to achieve nine forward speeds and reverse. An "X" appearing in a column indicates activation or engagement if the subject clutch or brake and that the clutch is carrying torque. No entry in a column indicates that the subject clutch or brake is inactive or disengaged. The actual gear ratios and ratio steps are also provided in FIG. 3 although it should be understood that these numerical values are presented for purposes of example and illustration only and that such values may be adjusted or varied over significant ranges to accommodate various applications and operational criteria of the automatic transmission 10.

In reverse, referred to in FIG. 3 as "Rev," the first friction clutch 80, the first friction brake 90 and the second friction brake 92 are all activated or engaged. In neutral, referred to by the letter "N" in FIG. 3, all fiction clutches and brakes are released or disengaged.

In first gear, the fourth friction clutch 86, the first friction brake 90 and the second friction brake 92 are activated or engaged. Second gear is achieved by deactivating or disengaging the second friction brake 92 and activating or engaging the third friction brake 94 while maintaining activation or engagement of the fourth friction clutch 86 and the first friction brake 90.

Third gear is achieved by deactivating or disengaging the third friction brake 94 and activating or engaging the first friction clutch 80 while maintaining activation or engagement of the fourth friction clutch 86 and the first friction brake 90. Fourth gear is achieved by deactivating or disengaging the first friction brake 90 and activating or engaging the third friction brake 94 while maintaining activation or engagement of the first friction clutch 80 and the fourth friction clutch 86.

Fifth gear is achieved by deactivating or disengaging the third friction brake 94 and activating or engaging the third friction clutch 84 while maintaining activation or engagement of the first friction clutch 80 and the fourth friction clutch 86. Sixth gear is achieved by deactivating or disengaging the fourth friction clutch 86 and activating or engaging the third friction brake 94 while maintaining activation or engagement of the first friction clutch 80 and the third friction clutch 84.

Seventh gear is achieved by deactivating or disengaging the third friction brake 94 and activating or engaging the first friction brake 90 while maintaining activation or engagement of the first friction clutch 80 and the third friction clutch 84. Eighth gear is achieved by deactivating or disengaging the first friction clutch 80 and activating or engaging the third friction brake 94 while maintaining activation or engagement of the third friction clutch 84 and the first friction brake 90.

Ninth gear is achieved by deactivating or disengaging the third friction brake 94 and activating or engaging the second friction clutch 82 while maintaining activation or engagement of the third friction clutch 84 and the first friction brake 90.

Figure 4:
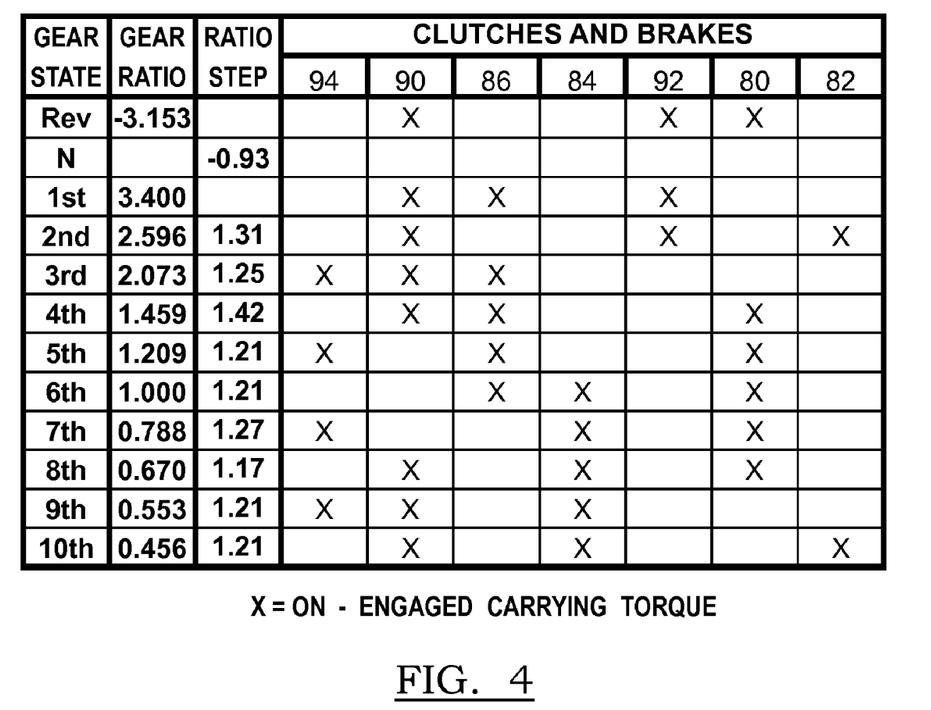
FIG. 4 is a truth table presenting the various combinations of engaged clutches and brakes which achieve a given forward or reverse gear or speed ratio and provide ten forward speeds in a multiple speed automatic transmission according to the present invention.

As noted above, it is the sequential selection and activation or engagement of the various friction clutches and brakes that provides upshifts and downshifts and operation of the automatic transmission 10 through the various speed or gear ratios. Accordingly, it should be appreciated that sequences other than that illustrated in FIG. 3 and described directly above are capable of providing other and, more importantly, additional speeds or gear ratios. In FIG. 4, a different sequence of friction clutch and brake activation or engagement provides a ten speed automatic transmission 10 from the same mechanical architecture illustrated in FIGS. 1 and 2 and described in the above text.

Referring now to FIG. 4, the sequence of operation, i.e., the activation or engagement, of the seven torque transmitting devices, which provides ten forward speeds or gear ratios and reverse, is illustrated. FIG. 4 is a truth table which presents the various combinations of clutches and brakes that are activated or engaged in the automatic transmission 10 illustrated in FIGS. 1 and 2 to achieve ten forward speeds and reverse. An "X" appearing in a column indicates activation or engagement if the subject clutch or brake and that the clutch is carrying torque. No entry in a column indicates that the subject clutch or brake is inactive or disengaged. The actual gear ratios and ratio steps are also provided in FIG. 4 although it should be understood that these numerical values are presented for purposes of example and illustration only and that such values may be adjusted or varied over significant ranges to accommodate various applications and operational criteria of the ten speed automatic transmission 10.

In reverse, referred to in FIG. 4 as "Rev," the first friction clutch 80, the first friction brake 90 and the second friction brake 92 are all activated or engaged. In neutral, referred to by the letter "N" in FIG. 4, all fiction clutches and brakes are released or disengaged.

In first gear, the fourth friction clutch 86, the first friction brake 90 and the second friction brake 92 are activated or engaged. Second gear is achieved by deactivating or disengaging the fourth friction clutch 86 and activating or engaging the second friction clutch 82 while maintaining activation or engagement of the first friction brake 90 and the second friction brake 92.

Third gear is achieved by deactivating or disengaging the second friction clutch 82 and the second friction brake 92 and activating or engaging the fourth friction clutch 86 and the third friction brake 94 while maintaining activation or engagement of the first friction brake 90. Fourth gear is achieved by deactivating or disengaging the third friction brake 94 and activating or engaging the first friction clutch 80 while maintaining activation or engagement of the fourth friction clutch 86 and the first friction brake 90.

Fifth gear is achieved by deactivating or disengaging the first friction brake 90 and activating or engaging the third friction brake 94 while maintaining activation or engagement of the first friction clutch 80 and the fourth friction clutch 86. Sixth gear is achieved by deactivating or disengaging the third friction brake 94 and activating or engaging the third friction clutch 84 while maintaining activation or engagement of the first friction clutch 80 and the fourth friction clutch 86.

Seventh gear is achieved by deactivating or disengaging the fourth friction clutch 86 and activating or engaging the third friction brake 94 while maintaining activation or engagement of the first friction clutch 80 and the third friction clutch 84. Eighth gear is achieved by deactivating or disengaging the third friction brake 94 and activating or engaging the first friction brake 90 while maintaining activation or engagement of the first friction clutch 80 and the third friction clutch 84.

Ninth gear is achieved by deactivating or disengaging the first friction clutch 80 and activating or engaging the third friction brake 94 while maintaining activation or engagement of the third friction clutch 84 and the first friction brake 90. Tenth gear is achieved by deactivating or disengaging the third friction brake 94 and activating or engaging the second friction clutch 82 while maintaining activation or engagement of the third friction clutch 84 and the first friction brake 90.

Figure 5:
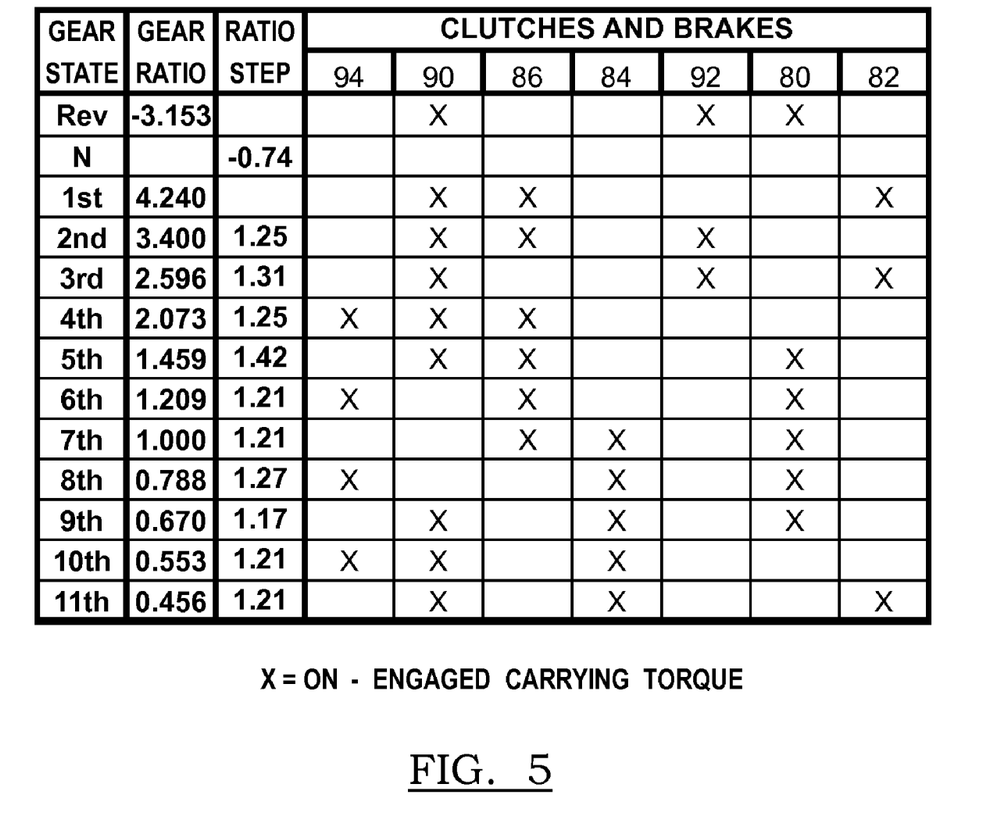
FIG. 5 is a truth table presenting the various combinations of engaged clutches and brakes which achieve a given forward or reverse gear or speed ratio and provide eleven forward speeds in a multiple speed automatic transmission according to the present invention.

Referring now to FIG. 5, a third sequence of friction clutch and brake activation or engagement provides an eleven speed automatic transmission 10 from the same mechanical architecture illustrated in FIGS. 1 and 2 and described above. FIG. 5 is a truth table which presents the various combinations of clutches and brakes that are activated or engaged in the automatic transmission 10 illustrated in FIGS. 1 and 2 to achieve eleven forward speeds and reverse. Once again, an "X" appearing in a column indicates activation or engagement if the subject clutch or brake and that the clutch is carrying torque whereas no entry in a column indicates that the subject clutch or brake is inactive or disengaged. The actual gear ratios and ratio steps are also provided in FIG. 5 although, as noted above, it should be understood that these numerical values are presented for purposes of example and illustration only and that such values may be adjusted or varied over significant ranges to accommodate various applications and operational criteria of the eleven speed automatic transmission 10.

In reverse, referred to in FIG. 5 as "Rev," the first friction clutch 80, the first friction brake 90 and the second friction brake 92 are all activated or engaged. In neutral, referred to by the letter "N" in FIG. 5, all fiction clutches and brakes are released or disengaged.

To achieve first gear, the second friction clutch 82, the fourth friction clutch 86 and the first friction brake 90 are all activated or engaged. Second gear is achieved by deactivating or disengaging the second friction clutch 82 and activating or engaging the second friction brake 92 while maintaining activation or engagement of the fourth friction clutch 86 and the first friction brake 90.

Third gear is achieved by deactivating or disengaging the fourth friction clutch 86 and activating or engaging the second friction clutch 82 while maintaining activation or engagement of the first friction brake 90 and the second friction brake 92. Fourth gear is achieved by deactivating or disengaging the second friction clutch 82 and the second friction brake 92 and activating or engaging the fourth friction clutch 86 and the third friction brake 94 while maintaining activation or engagement of the first friction brake 90.

Fifth gear is achieved by deactivating or disengaging the third friction brake 94 and activating or engaging the first friction clutch 80 while maintaining activation or engagement of the fourth friction clutch 86 and the first friction brake 90. Sixth gear is achieved by deactivating or disengaging the first friction brake 90 and activating or engaging the third friction brake 94 while maintaining activation or engagement of the first friction clutch 80 and the fourth friction clutch 86.

Seventh gear is achieved by deactivating or disengaging the third friction brake 94 and activating or engaging the third friction clutch 84 while maintaining activation or engagement of the first friction clutch 80 and the fourth friction clutch 86. Eighth gear is achieved by deactivating or disengaging the fourth friction clutch 86 and activating or engaging the third friction brake 94 while maintaining activation or engagement of the first friction clutch 80 and the third friction clutch 84.

Ninth gear is achieved by deactivating or disengaging the third friction brake 94 and activating or engaging the first friction brake 90 while maintaining activation or engagement of the first friction clutch 80 and the third friction clutch 84. Tenth gear is achieved by deactivating or disengaging the first friction clutch 80 and activating or engaging the third friction brake 94 while maintaining activation or engagement of the third friction clutch 84 and the first friction brake 90. Finally, eleventh gear is achieved by deactivating or disengaging the third friction brake 94 and activating or engaging the second friction clutch 82 while maintaining activation or engagement of the third friction clutch 84 and the first friction brake 90.

Figure 6:
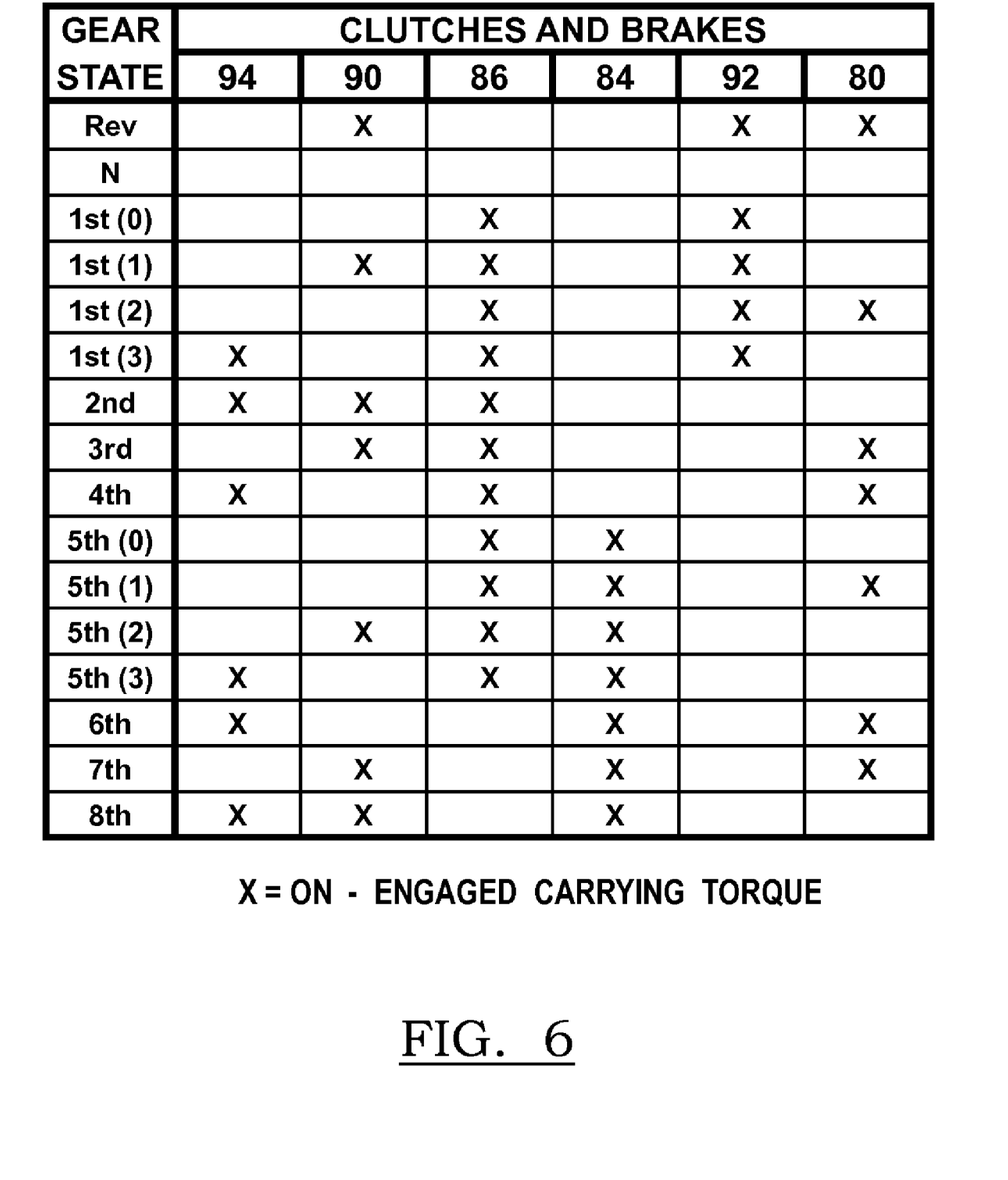
FIG. 6 is a truth table that is an alternative to that presented in FIG. 3 which presents various alternate combinations of engaged clutches and brakes which achieve a given forward or reverse gear or speed ratio and provide eight forward speeds in a multiple speed automatic transmission according to the present invention.

Referring now to FIG. 6, a truth table presents an alternate arrangement of clutch and brake engagement to that presented in FIG. 3 that provides eight forward speeds or gear ratios and reverse. A given or selected speed or gear ratio (and neutral) represented by a particular row is achieved by activation or engagement of those clutches and brakes represented in columns in which an "X" appears. With regard to first and fifth gears, the truth table of FIG. 6 also presents alternative clutch and brake engagement or activation arrangements which are designated, for example, 1st (0), 1st (1), 1st (2), etc. While the parenthetical numbers primarily identify and differentiate, they also suggest an order of preference, in that the (0) gear state utilizes the minimum number of brakes and clutches to obtain the desired gear or speed ratio, while the (1), (2), (3) and (4) gear states involve the minimum number of on-coming and off-going brakes and clutches for the next predicted speed or gear ratio. It will be appreciated that the upshift sequence through the speeds or gear ratios occurs in a manner corresponding to the sequences set forth in the text above.

Figure 7:
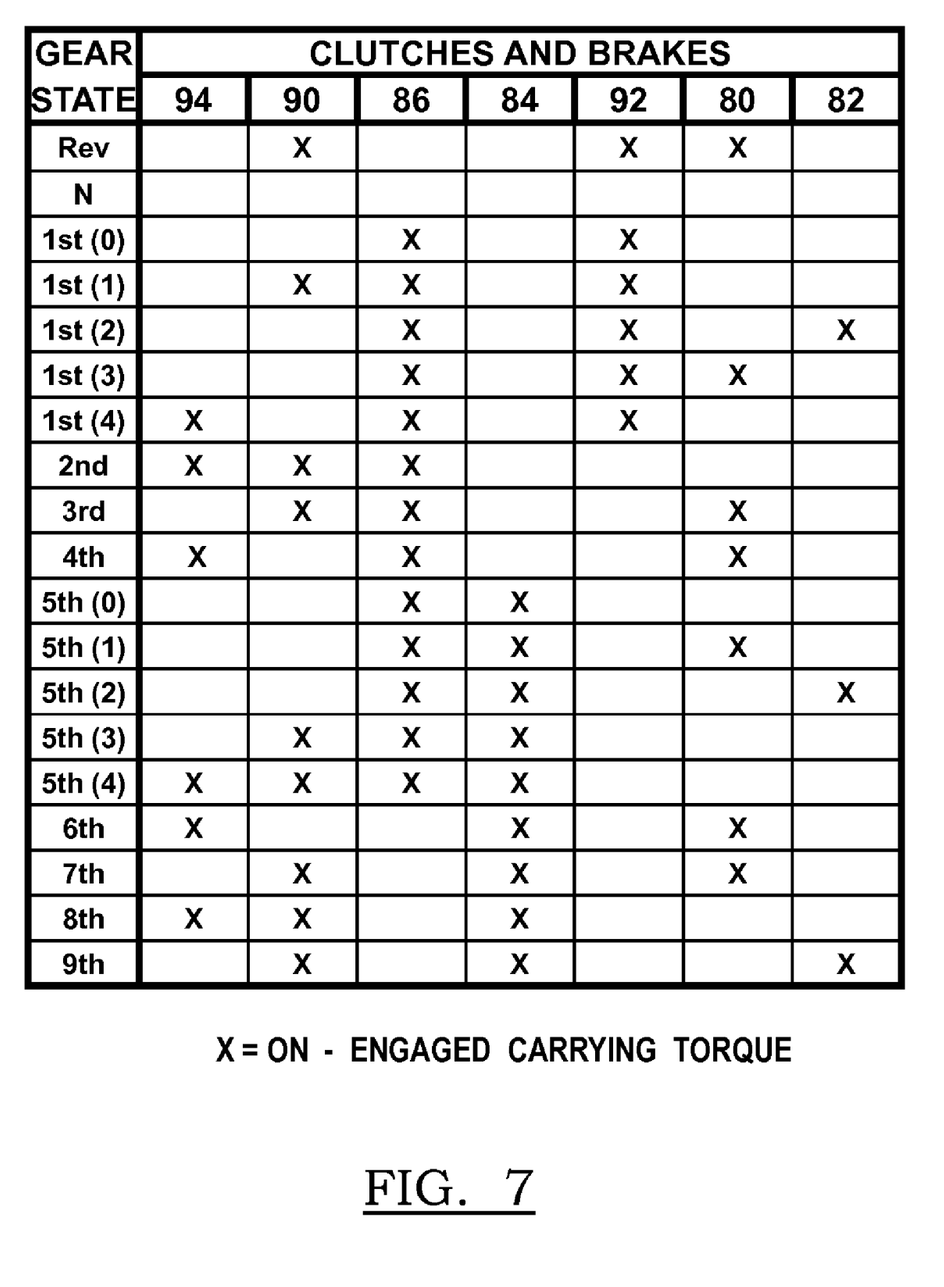
FIG. 7 is a truth table that is an alternative to that presented in FIG. 3 which presents various alternate combinations of engaged clutches and brakes which achieve a given forward or reverse gear or speed ratio and provide nine forward speeds in a multiple speed automatic transmission according to the present invention.

Referring now to FIG. 7, a truth table presents an alternate arrangement of clutch and brake engagement to that presented in FIG. 3 that provides nine forward speeds or gear ratios and reverse. A given or selected speed or gear ratio (and neutral) represented by a particular row is achieved by activation or engagement of those clutches and brakes represented in columns in which an "X" appears. Once again, with regard to first and fifth gears, the truth table of FIG. 7 also presents alternative clutch and brake engagement or activation arrangements which are designated, for example, 1st (0), 1st (1), 1st (2), etc. and which are explained directly above. It will be appreciated that the upshift sequence through the speeds or gear ratios occurs in a manner corresponding to the sequences set forth in the text above.

Figure 8:
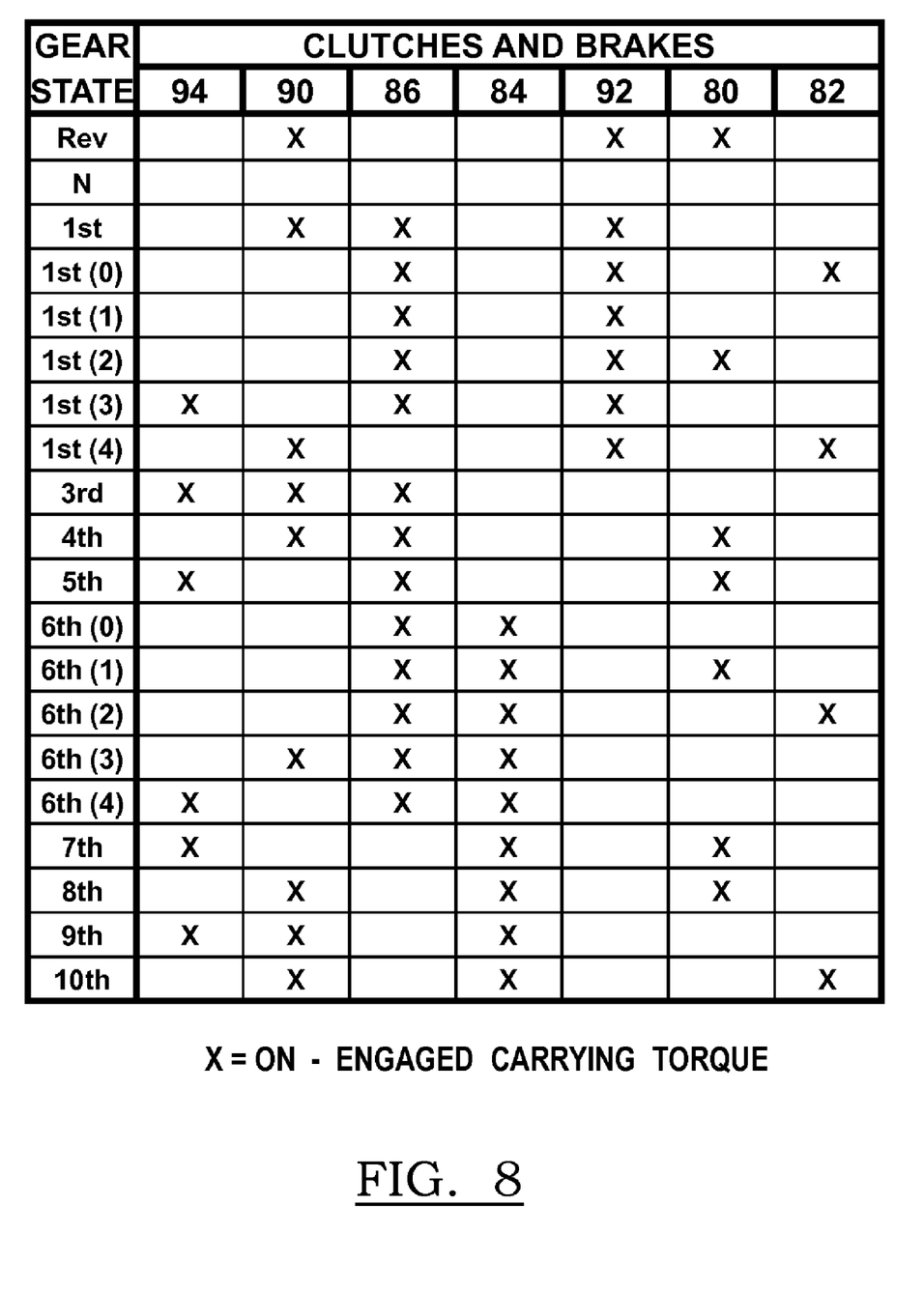
FIG. 8 is a truth table that is an alternative to that presented in FIG. 4 which presents various alternate combinations of engaged clutches and brakes which achieve a given forward or reverse gear or speed ratio and provide ten forward speeds in a multiple speed automatic transmission according to the present invention.

Referring now to FIG. 8, a truth table presents an alternate arrangement of clutch and brake engagement to that presented in FIG. 4 that also provides ten forward speeds or gear ratios and reverse. A given or selected speed or gear ratio (and neutral) represented by a particular row is achieved by activation or engagement of those clutches and brakes represented in columns in which an "X" appears. With regard to first and sixth gears, the truth table of FIG. 8 also presents alternative clutch and brake engagement or activation arrangements which are designated, for example, 1st (0), 1st (1), 1st (2), etc. and which are explained above. Once again, the upshift sequence through the speeds or gear ratios occurs in a manner corresponding to the sequences set forth in the text above.

Figure 9:
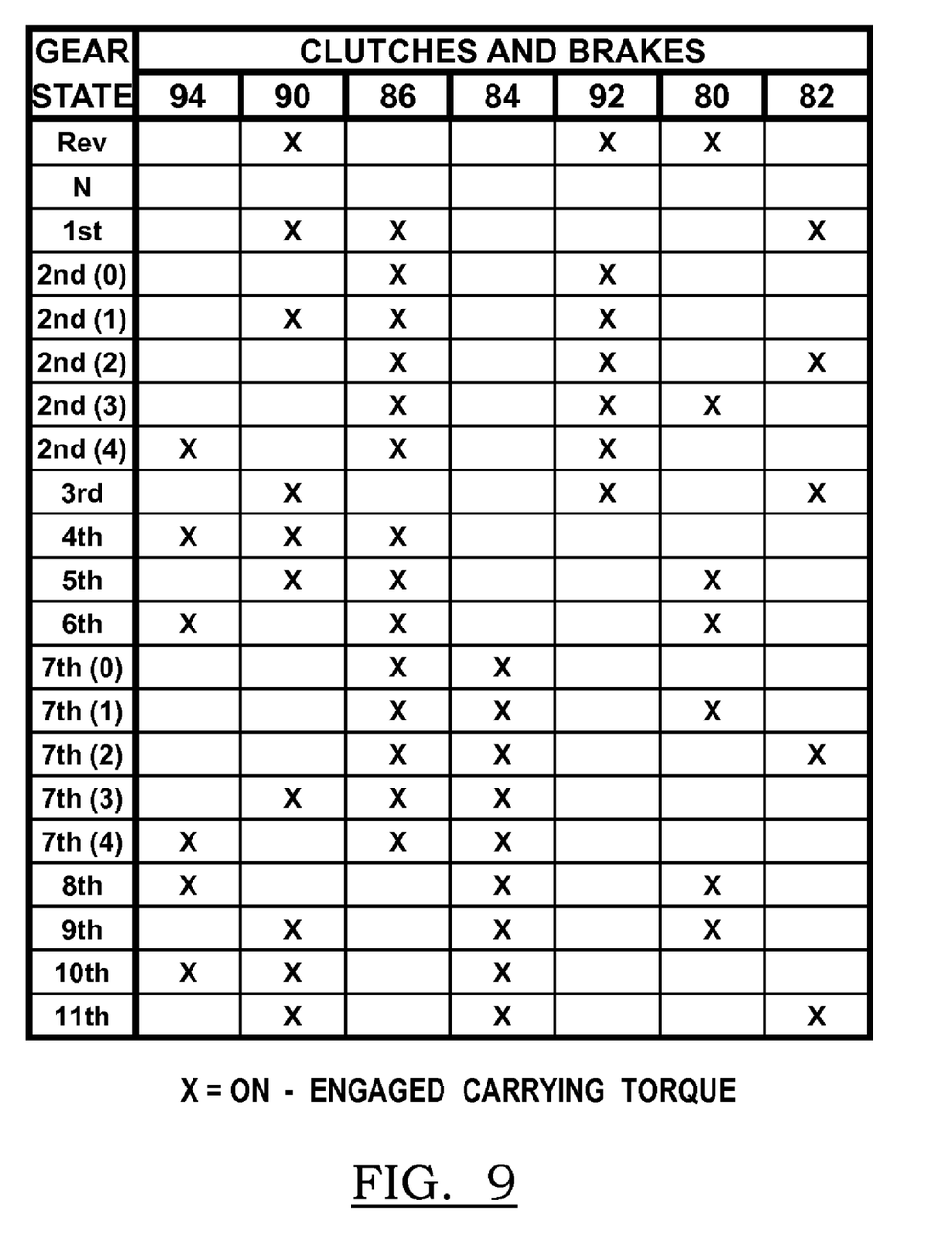
FIG. 9 is a truth table that is an alternative to that presented in FIG. 5 which presents various alternate combinations of engaged clutches and brakes which achieve a given forward or reverse gear or speed ratio and provide eleven forward speeds in a multiple speed automatic transmission according to the present invention.

Referring now to FIG. 9, a truth table presents an alternate arrangement of clutch and brake engagement to that presented in FIG. 5 that also provides eleven forward speeds or gear ratios and reverse. A given or selected speed or gear ratio (and neutral) represented by a particular row is achieved by activation or engagement of those clutches and brakes represented in columns in which an "X" appears. With regard to second and seventh gears, the truth table of FIG. 9 also presents alternative clutch and brake engagement or activation arrangements which are designated, for example, 2nd (0), 2nd (1), 2nd (2), etc. and which are explained above. Again, it will be appreciated that the upshift sequence through the speeds or gear ratios occurs in a manner corresponding to the sequences set forth in the text above.

The description of the invention is merely exemplary in nature and variations that do not depart from the gist of the invention are intended to be within the scope of the invention. Such variations are not to be regarded as a departure from the spirit and scope of the invention.

What is claimed is:

1. A multiple speed automatic transmission comprising, in combination, a first, a second, a third and a fourth planetary gear assembly, each of said planetary gear assemblies having three members, an input member, an output member connected to one of said members of said first planetary gear assembly, a first member for connecting said one of said members of said second planetary gear assembly with one of said members of said fourth planetary gear assembly, a second member for connecting one of said members of said third planetary gear assembly with said one of said members of said fourth planetary gear assembly, a third member for connecting another of said members of said first planetary gear assembly with another of said members of said second planetary gear assembly, a fourth member for connecting another member of said third planetary gear assembly with said another of said members of said fourth planetary gear assembly, a fifth member for connecting yet another of said members of said first planetary gear assembly with yet another of said members of said second planetary gear assembly, and a plurality of torque transmitting devices selectively engageable to connect: said input shaft to said fourth member, said input shaft to yet another of said members of said third planetary gear assembly, said input shaft to said another member of said second planetary gear assembly, said input shaft to said fifth member, yet another of said members of said fourth planetary gear assembly to ground, said another of said members of said first planetary gear assembly to ground and said yet another of said members of said third planetary gear assembly to ground.

2. The multiple speed automatic transmission of claim 1 wherein a first group of said plurality of torque transmitting devices are clutches and a second group of said plurality of torque transmitting devices are brakes.

3. The multiple speed automatic transmission of claim 1 wherein said one member of said first planetary gear assembly is a planet gear carrier, said another member of said first planetary gear assembly is a ring gear and said yet another member of said first planetary gear assembly is a sun gear.

4. The multiple speed automatic transmission of claim 1 wherein said one member of said second planetary gear assembly is a ring gear, said another member of said second planetary gear assembly is a planet gear carrier and said yet another member of said second planetary gear assembly is a sun gear.

5. The multiple speed automatic transmission of claim 1 wherein said one member of said third planetary gear assembly is a planet gear carrier, said another member of said third planetary gear assembly is a ring gear and said yet another member of said third planetary gear assembly is a sun gear.

6. The multiple speed automatic transmission of claim 1 wherein said one member of said fourth planetary gear assembly is a planet gear carrier, said another member of said fourth planetary gear assembly is a sun gear and said yet another member of said fourth planetary gear assembly is a ring gear.

7. The multiple speed automatic transmission of claim 1 wherein each of said three members of said first, second, third and fourth planetary gear assemblies is one of a sun gear, a ring gear and a planet gear carrier.

8. The multiple speed automatic transmission of claim 1 wherein said plurality of torque transmitting devices includes a friction clutch connected between said input shaft and said fourth member, said input shaft and said yet another of said members of said third planetary gear assembly, said input shaft and said another member of said second planetary gear assembly and said input shaft and said fifth member.

9. The multiple speed automatic transmission of claim 1 wherein said plurality of torque transmitting devices includes a friction brake connected between said yet another of said members of said fourth planetary gear assembly and ground, said another of said members of said first planetary gear assembly and ground and said yet another of said members of said third planetary gear assembly and ground.

10. A multiple speed automatic transmission comprising, in combination,
a first, a second, a third and a fourth planetary gear assembly, each of said planetary gear assemblies having a sun gear, a planet gear carrier including a plurality of planet gears and a ring gear,
an input member,
an output member connected to said planet gear carrier of said first planetary gear assembly,
a first member for connecting said ring gear of said second planetary gear assembly to said planet gear carrier of said fourth planetary gear assembly,
a second member for connecting said planet gear carrier of said fourth planetary gear assembly to said planet gear carrier of said third planetary gear assembly,
a third member for connecting said ring gear of said first planetary gear assembly to said planet gear carrier of said second planetary gear assembly,
a fourth member for connecting said ring gear of said third planetary gear assembly to said sun gear of said fourth planetary gear assembly,
a fifth member for connecting said sun gear of said first planetary gear assembly to said sun gear of said second planetary gear assembly, and
a plurality of torque transmitting devices selectively engageable to connect: said input shaft to said fourth member, said input shaft to said sun gear of said third planetary gear assembly, said input shaft to said planet gear carrier of said second planetary gear assembly, said input shaft to said fifth member, said ring gear of said fourth planetary gear assembly to ground, said ring gear of said second planetary gear assembly to ground and said sun gear of said third planetary gear assembly to ground.

11. The multiple speed automatic transmission of claim 10 wherein a first group of said plurality of torque transmitting devices are clutches and a second group of said plurality of torque transmitting devices are brakes.

12. The multiple speed automatic transmission of claim 10 wherein a first clutch connects said input shaft to said fourth member, a second clutch connects said input shaft to said sun gear of said third planetary gear assembly, a third clutch connects said input shaft to said planet gear carrier of said second planetary gear assembly and a fourth clutch connects said input shaft to said fifth member.

13. The multiple speed automatic transmission of claim 10 wherein various sequenced combinations of torque transmitting device engagement provide nine, ten or eleven forward gear ratios.

14. The multiple speed automatic transmission of claim 10 further including a sixth member for interconnecting said sun gear of said third planetary gear assembly with two torque transmitting devices.

15. The multiple speed automatic transmission of claim 10 wherein a first brake connects said ring gear of said fourth planetary gear assembly to ground, a second brake connects said ring gear of said first planetary gear assembly to ground, and a third brake connects said sun gear of said third planetary gear assembly to ground.

16. The multiple speed automatic transmission of claim 15 further including a sixth member for interconnecting said sun gear of said third planetary gear assembly to said third brake and a clutch.

* * * * *